US011381471B2

(12) United States Patent
Zilberman et al.

(10) Patent No.: US 11,381,471 B2
(45) Date of Patent: Jul. 5, 2022

(54) SYSTEM AND METHOD FOR PREDICTING AND HANDLING SHORT-TERM OVERFLOW

(71) Applicant: DEUTSCHE TELEKOM AG, Bonn (DE)

(72) Inventors: Polina Zilberman, Eshkolot (IL); Rami Puzis, Ashdod (IL); Elad Rapaport, Lehavim (IL); Oliver Holschke, Berlin (DE); Ingmar Poese, Wildau (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 17/334,838

(22) Filed: May 31, 2021

(65) Prior Publication Data

US 2021/0377131 A1 Dec. 2, 2021

(30) Foreign Application Priority Data

May 31, 2020 (IL) .......................................... 275018

(51) Int. Cl.
*G06F 15/173* (2006.01)
*H04L 41/16* (2022.01)
(Continued)

(52) U.S. Cl.
CPC ............... *H04L 41/16* (2013.01); *G06N 3/04* (2013.01); *G06N 20/20* (2019.01);
(Continued)

(58) Field of Classification Search
CPC ..... H04L 41/16; H04L 41/0654; H04L 43/04; H04L 43/062; H04L 43/067;
(Continued)

(56) References Cited

U.S. PATENT DOCUMENTS

| 10,979,322 B2* | 4/2021 | Kulshreshtha .......... H04L 43/10 |
| 2012/0040662 A1* | 2/2012 | Rahman ............ H04W 36/0079 |
| | | 455/423 |

(Continued)

FOREIGN PATENT DOCUMENTS

| EP | 2469758 A1 | 6/2012 | |
| WO | WO-2012085498 A1 * | 6/2012 | ........... H04L 47/127 |
| WO | WO-2018112657 A1 * | 6/2018 | ........... H04L 43/106 |

OTHER PUBLICATIONS

Extended European Search Report for Application No. 21176792.6, dated Nov. 11, 2021, 11 pages.
(Continued)

*Primary Examiner* — Karen C Tang
(74) *Attorney, Agent, or Firm* — Hoffman Warnick LLC

(57) ABSTRACT

A system for early predicting of impending data overflow situations in data networks, comprising one or more sensors being networked computers that do not provide services, for collecting monitored data regarding network traffic volume from content providers to an Internet Service Provider (ISP) entering or exiting the ISP via peering autonomous systems connected to the ISP via physical links; one or more processors executing one or more deep learning models, being adapted to: identify over the data network being handovers alternative peering links, which are not inherent Private Network Interconnects (PNI) between the content providers and the ISP; determine static or dynamic threshold for dataflow anomaly associated with overflow; for each alternative handover, predict impending overflow situation by applying ML algorithms to the collected data that corresponds to the each alternative handover.

19 Claims, 4 Drawing Sheets

(51) Int. Cl.
*G06N 20/20* (2019.01)
*G06N 3/04* (2006.01)
*H04L 41/0654* (2022.01)
*H04L 43/04* (2022.01)
*H04L 43/062* (2022.01)
*H04L 43/067* (2022.01)
*H04L 43/0888* (2022.01)
*G06F 15/16* (2006.01)

(52) U.S. Cl.
CPC .......... *H04L 41/0654* (2013.01); *H04L 43/04* (2013.01); *H04L 43/062* (2013.01); *H04L 43/067* (2013.01); *H04L 43/0888* (2013.01)

(58) Field of Classification Search
CPC . H04L 43/0888; H04L 43/0876; H04L 45/22; H04L 47/11; H04L 47/127; H04L 41/147; G06N 3/04; G06N 20/20
USPC .......................................................... 709/231
See application file for complete search history.

(56) References Cited

U.S. PATENT DOCUMENTS

| | | | | |
|---|---|---|---|---|
| 2019/0349392 | A1* | 11/2019 | Wetterwald | H04J 3/0667 |
| 2020/0029240 | A1* | 1/2020 | Li | H04W 4/00 |
| 2020/0177311 | A1* | 6/2020 | Ho | H04L 1/0045 |
| 2020/0186411 | A1* | 6/2020 | Ravichandran | H04L 41/0668 |
| 2020/0217677 | A1* | 7/2020 | Wang | G06N 7/005 |
| 2020/0249039 | A1* | 8/2020 | Lassoued | G06N 20/00 |
| 2020/0252300 | A1* | 8/2020 | Levy-Abegnoli | H04L 47/12 |
| 2020/0259722 | A1* | 8/2020 | Kocberber | H04L 41/5048 |
| 2020/0259740 | A1* | 8/2020 | Wetterwald | H04L 43/0882 |
| 2020/0296023 | A1* | 9/2020 | Kumar | H04L 43/103 |
| 2020/0389417 | A1* | 12/2020 | Wetterwald | H04L 43/026 |
| 2021/0084382 | A1* | 3/2021 | Kellicker | H04N 21/442 |
| 2021/0158051 | A1* | 5/2021 | Dalal | G06K 9/3233 |
| 2021/0158233 | A1* | 5/2021 | Lakshminarayanan | G06Q 50/30 |

OTHER PUBLICATIONS

Alessandro Floris et al., "QoE-Aware OTT-ISP Collaboration in Service Management: Architecture and Approaches," ACM Transactions on Multimedia Computing Communications andApplications, Association for Computing Machinery, vol. 14, No. 2s, Apr. 25, 2018, pp. 1-24.

Motamedi et al., "A Survey of Techniques for Internet Topology Discovery," IEEE Communications Surveys & Tutorials, vol. 17, No. 2, Dec. 2, 2014, pp. 1044-1065.

Pujol et al, "Steering hyper-giants' traffic at scale," Dec. 3, 2019; Dec. 9, 2019-Dec. 12, 2019, Dec. 3, 2019, pp. 82-95.

* cited by examiner

SYSTEM AND METHOD FOR PREDICTING AND HANDLING SHORT-TERM OVERFLOW

FIELD OF THE INVENTION

The present invention relates to the field of data routing and content providing. More particularly, the present invention relates to an automatic system and method for predicting and handling short-term overflow situations and specific interconnection nodes that will ingress the overflow traffic.

BACKGROUND OF THE INVENTION

Nowadays, eyeball networks (access networks that normally do not generate their own data, but instead, are used to browse the Internet, read email, etc. and consume content) in many regions of the world receive the major volume share of internet traffic for their end users from only a few content providers and distributors. This concentration process took place over the past decade leading to a situation where about ten Autonomous Systems send 70 or more percent of total traffic to networks.

FIG. 1 (prior art) shows a graph of the development of cumulated shares of internet traffic distributed by Autonomous Systems over past 13 years. This traffic portion is being referred to as hyper-giant traffic.

The increased volume share of hyper-giant traffic is correlated with a higher share of end users consuming the services that are directly related to this traffic. This situation is also reflected in the assessment of networking risks and the potential impacts on the network providers' business in case of network failures: the value-at-risk regarding hyper-giant traffic disruptions and the correspondingly large portfolio of services potentially becoming unavailable to end users, has significantly increased, due to the structural consolidation: because the failure events $e_i$ (e.g., failures of interconnection links between the hyper-giants' infrastructures and the eyeball network) now have more consequences $c_i$ (e.g., in terms of a higher number of affected services and end users that are assembled "behind" an interconnection link), a greater chance of customer disturbance, more penalties due to Service-Level Agreement (SLA—a commitment between a service provider and a client) violations, and larger (negative) impact on brand perception, the respective risks have become higher. This logically follows as long as the probabilities $p_i$ of failure events to occur are unchanged and the ratio of the specific traffic's interconnection links ($e_i$) to affected end users ($c_i$) is not diversified.

Less extreme events $e_i$ than complete failures of interconnection links can occur. They are more likely to happen, yet may lead to similar loss of traffic (i.e. overflow events).

Overflow events occur when the capacity of an interconnection link between hypergiant infrastructure and eyeball network is exhausted by the traffic being sent. The consequence ci is, without any counteraction, loss of traffic and service degradation. Content delivery infrastructures proactively protect their service delivery in these events on their main interconnection links to eyeball networks by responding to it through sending traffic over alternative interconnection routes. However, due to the asymmetric capacities of direct Private Network Interconnections (PNIs—which are well built-out in contrast to public interconnections), there is high probability that the re-routed traffic portion will arrive at insufficient interconnection capacities.

The consequences of overflow events are traffic losses and degraded quality of service. Because of the exposure to high risk associated with these interconnection links, eyeball networks require effective means of mitigating the risks of complete failure events and overflow events.

The possibility of determining in advance the occurrence of such events would enable eyeball networks to respond adequately with countermeasures ahead of time, for ultimately avoiding the event from occurring at all, as well as the corresponding costly consequences.

Predicting complete failures of interconnection links is a hard task. In contrast, predicting overflow events becomes a practical possibility because various trends and patterns exist in the data prior to an overflow event, which may be learned and modelled by machine learning methods.

Internet Services Usage

FIG. 2 shows the usage of internet applications and thereof market shares of hyper-giants. It can be seen that the market share of hyper-giants dominates in most internet services, especially in messaging and traffic-intense online video services.

Large content providers are responsible for sending the majority of the content traffic to users, which leads to the concentration of web traffic within few publishers. These content providers build and operate distributed infrastructures, which are interconnecting with eyeball networks at multiple locations (spatially distributed interconnected content sources). These content providers build and operate their infrastructures in a way to match real content demands closely. This means that in situations of unexpectedly high traffic demand, content providers exhaust their own infrastructure capacity and temporarily resort to third party distribution infrastructures. As these third party infrastructures have different interconnections to the eyeball network, sudden anomalous situations such as traffic surges on previously unused interconnection links may have significant (possibly negative) impacts on both capacity utilization and commercial outcomes, e.g. change of direction of payments. These anomalous situations are called "Data Over Flow" or "overflow". It is of interest to eyeball networks to reliably predict these overflows, in order to optimize interconnection capacity allocation and/or commercial conditions.

Data transmission networks have communication channels (links) designed to transmit content to Internet Service Providers (ISPs). For example, Netflix Inc. (a media-services provider and production company, Los Gatos, Calif., U.S.A.) has a direct link from major ISPs, such as Deutsche Telekom AG, to transmit movies and TV series content. The data transmission networks have a main direct communication channel that should be of sufficiently high capacity, to provide good service to customers (in the case of Netflix, a good service is a movie or series originated without a short-lived fault called glitches or delays, at reasonable run-speed and reasonable quality). The direct communication channel should be wideband and have sufficient capacity to support the amount of information that should pass through.

The problem is that at certain hours, especially in the evening, there are many consumers who consume information at the same time, and because of the high volume simultaneous information consumption, the capacity of the direct channel of communications networks (content providers) is not sufficient to transmit all the information, leading to Data Over Flow. In this case, the content provider transfers the excess information that cannot pass through the direct channel through alternative channels (through other providers).

However, the transmission of information on alternative channels has several disadvantages: Their Quality of Service (QoS) is not always sufficient, like the main direct channel, which causes, in the case of Netflix, to glitches in the streamed movie, delays, and slow data transfer rates. Another disadvantage is that the ISPs are forced to pay money to alternative channels, thereby requiring high costs for poor quality service. In addition, once a Data Over Flow situation happens many times, it becomes very difficult to overcome. This causes considerable financial damage to the ISPs and the customer, who receives poor quality service.

It is therefore an object of the present invention to provide an automatic system and method for predicting short-term horizon Data Over Flow situations sufficient time in advance. and specific interconnection nodes that will ingress the overflow traffic, in order to enable the ISPs to prepare to the Data Over Flow situation.

It is therefore an object of the present invention to provide an automatic system and method for predicting short-term horizon Data Over Flow situations sufficient time in advance. and specific interconnection nodes that will ingress the overflow traffic, in order to provide better Quality of Service (QoS) and reduce costs.

Other objects and advantages of the invention will become apparent as the description proceeds.

SUMMARY OF THE INVENTION

A method for early predicting of impending data overflow situations in data networks, comprising the steps of:
a) collecting monitored data regarding network traffic volume from content providers to an Internet Service Provider (ISP) entering or exiting the ISP via peering autonomous systems connected to the ISP via physical links;
b) identifying alternative peering links being handovers, which are not inherent private network interconnects (PNIs) between the content providers and the ISP;
c) determining static or dynamic threshold for dataflow anomaly associated with overflow; and
d) for each alternative handover, predicting impending overflow situation by applying ML algorithms to the collected data that corresponds to the each alternative handover.

The applied ML algorithms may be:
Convolutional Neural Network (CNN);
Recurrent Neural Networks (RNNs);
Feed forward neural network;
Deep neural network;
Vanilla neural networks.

Data flow from content providers to an ISP may be monitored for the volume of traffic and paths through which the traffic flows, by sensors being networked computers that typically do not provide services that are deployed over the data network.

An overflow situation may be determined by the data passed across a handover and the transition times, while predicting, for each alternative handover, when the each alternative handover will be used to transfer at least a portion of the content.

The collected data may be Multivariate Time Series (MTS) data, in the form of traffic from several autonomous systems and handovers, which are sampled synchronously.

Overflow prediction may be carried out using an ensemble of deep learning models.

The models that were used in the overflow prediction may be a combination of LSTNet and convolutional neural networks (CNNs) automatically generated by EEG NAS.

Traffic overflow volume may be predicted for the sum of all handovers, for providing indications regarding overflow situation, or separately for each specific handover, for providing indications regarding alternative links being candidates for overflow situations.

An alert to each ISP regarding a situation of the Data overflow and the alternative channels that should be operated in the situation may be provided in advance.

The ISP may select alternative handovers through which excess data will be routed during predicted overflow periods.

A system for early predicting of impending data overflow situations in data networks, comprising:
a) one or more sensors being networked computers that do not provide services, for collecting monitored data regarding network traffic volume from content providers to an Internet Service Provider (ISP) entering or exiting the ISP via peering autonomous systems connected to the ISP via physical links;
b) one or more processors executing one or more deep learning models, being adapted to:
c) identify over the data network being handovers alternative peering links, which are not inherent Private Network Interconnects (PNI) between the content providers and the ISP;
d) determine static or dynamic threshold for dataflow anomaly associated with overflow; and
e) for each alternative handover, predict impending overflow situation by applying ML algorithms to the collected data that corresponds to the each alternative handover.

BRIEF DESCRIPTION OF THE DRAWINGS

The above and other characteristics and advantages of the invention will be better understood through the following illustrative and non-limitative detailed description of preferred embodiments thereof, with reference to the appended drawings, wherein.

DETAILED DESCRIPTION OF THE INVENTION

Figure 1:
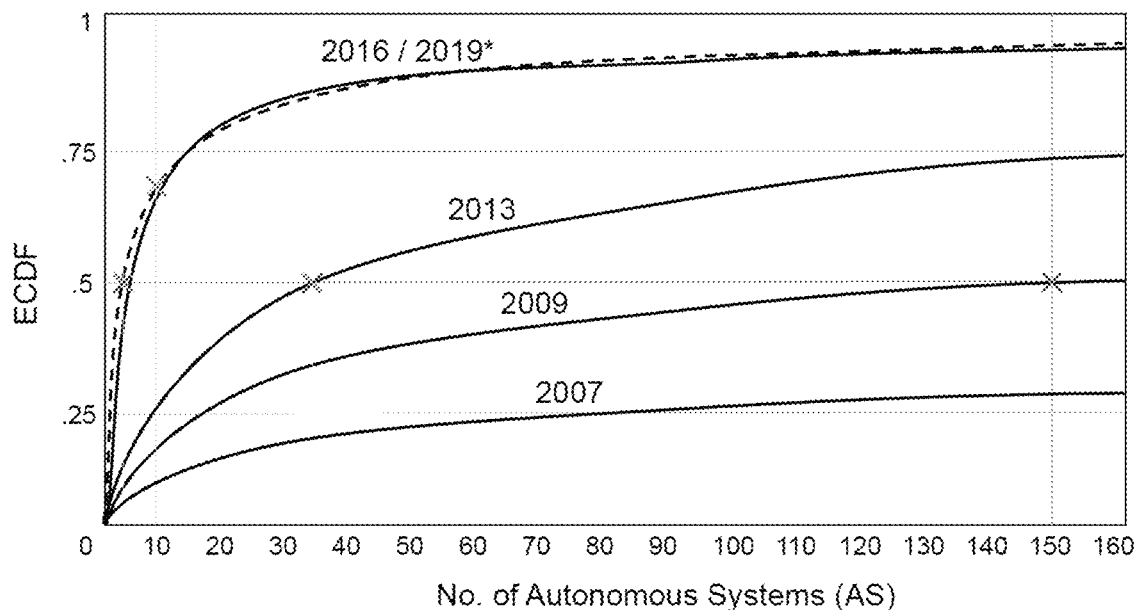
FIG. 1 (prior art) shows a graph of the development of cumulated shares of internet traffic distributed by Autonomous Systems over past 13 years.
Figure 2:
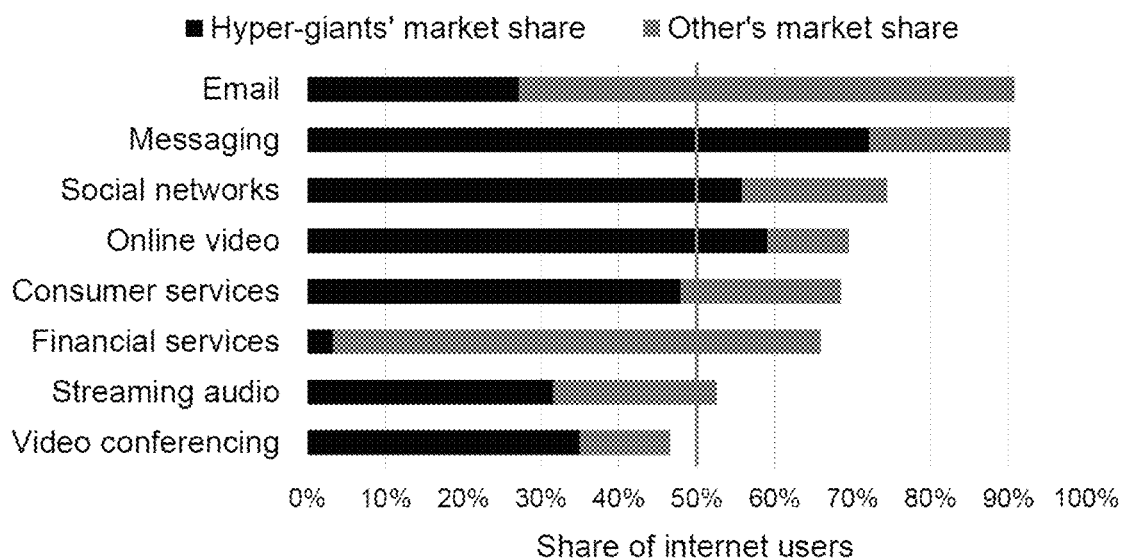
FIG. 2 shows the usage of internet applications and thereof market shares of hyper-giants.

The present invention relates to a system and method for predicting Data Over Flow in a direct connection channel between a content provider and an Internet service Provider (ISP). The method is based on sensors (networked computers that typically do not provide services) that monitor the data flow from the content provider to the ISP. The sensors monitor the volume of traffic and paths through which the traffic flows, and then apply machine learning algorithms to analyze the data. Data analysis is done according to what happened on the alternative channels for a certain period of time, for example, a few days ago, in terms of the type of data passed across the channels and the transition times (dates and times), while trying to predict for each alternative channel, when they will be used to transfer some of the content. For example, the algorithm can predict that on a particular day at 5 pm, there will be a Data Over Flow situation and the traffic (data) that cannot pass through the main direct channel will have to be routed to certain alternative channels. The data analysis and forecasting process is all done automatically using machine learning algorithms (based on what happened predetermined days before).

Traffic volumes can be monitored using variety of protocols, such as Netflow (is a network protocol developed by Cisco for collecting IP traffic information and monitoring network flow). The routers do the monitoring and send this data to collector servers as a part of a standard network monitoring and management infrastructure. In one embodiment, this data is obtained from the network management servers. According to other embodiments, this data may be obtained directly from the network routers that provide the data flow services.

The method proposed by the present invention enables to give an alert to the ISPs sufficiently in advance about a situation of the Data Over Flow and the alternative channels that should be operated in this situation, thereby enabling the ISPs to select the content provider, through the channels of which to transmit the information. This advance alert result in a higher QoS (high quality and accurate transmission content) and a significant reduction in costs (cheaper and higher quality alternative channels can be selected for the transmission of data).

The method proposed by the present invention is based on an ensemble of Deep Learning techniques, for predicting short-term horizon overflow situations, as well as the specific interconnection nodes that will ingress the overflow traffic. The method has been tested with a traffic data set from a large European service provider in the time range 2017 to 2019.

Multivariate Time Series (MTS) Forecasting

MTS forecasting is a challenging task, which involves the leveraging of interdependencies between different variables over time, in order to make predictions for a specific variable or a set of variables in the future. Vector Auto Regression (VAR—a statistical model used to capture the relationship between multiple quantities as they change over time) is one of the most simple and common methods for MTS forecasting [19]. It is a linear model, in which each predicted variable is a weighted sum of past measurements (of itself and other variables in the time series).

VAR is an essentially linear regression, where the inputs are past values from each variable in the MTS. Linear models usually fail to capture complex intricacies of large multivariate datasets, and other methods have been developed to overcome this problem.

Current state of the art methods in MTS forecasting use the "attention mechanism" [17], originally developed for use in natural language processing to overcome the inherent "vanishing gradient" problem in Recurrent Neural Networks (RNNs—a class of artificial neural networks where connections between nodes form a directed graph along a temporal sequence) where "old" inputs are forgotten by the model and their effect in prediction diminishes. Later, attention mechanism was generalized to highlight specific parts of the input data in other domains as well, such as speech emotion recognition [10].

Lai et al. [8] created LSTNet (a deep learning framework specifically designed for multivariate time series forecasting tasks with a mixture of long- and short-term patterns), an MTS forecasting method, for taking both long-term recurrent patterns and short-term recurrent patterns of MTS into account, as well as inter-relations between the different data variables. The neural network they constructed includes a convolutional layer, for extracting short-term temporal dependencies in the data, as well as dependencies between different variables. This is achieved using multiple 2D filters, which slide over the time and variable dimensions of the data. The output of the convolutional layer is fed into a Gated Recurrent Unit (GRU—a gating mechanism in recurrent neural networks, is like a long short-term memory with forget gate) recurrent layer, for discovering long-term temporal dependencies in the processed data.

To alleviate the common vanishing gradient symptom, a recurrent skip connection has been proposed, where in datasets with period p, the recurrent hidden cell at time t receives hidden cell t−p as additional input. The outputs of the recurrent and recurrent-skip layer are combined with a dense layer. The downside of this component is that p needs to be tuned manually per dataset.

As an alternative approach to recurrent-skip the authors proposed a temporal attention layer, utilizing a weighted combination of all previous hidden representations in each prediction, based on a similarity function such as dot-product or cosine. An auto-regressive component has also been utilized, for dealing with scale changing of the data over time. Lai et al. shown that this method outperforms traditional linear models, as well as Vanilla RNN prediction models.

Another approach utilizing attention is the Memory Time-series Network (MTNet) by Chang et al. [2]. This model uses long term historical data in addition to the short-term data sample given for forecasting. By using two encoders, one for the short term data and one for the long-term data, the attention mechanism is able to find the most relevant long-term data block to help forecast the current short-term data. As in Lai et al., the attention is performed over the time dimension. This output is concatenated with an autoregressive model output to form the final prediction.

Shih et al. [15] take the attention mechanism one step further, and use it to focus on specific variables in the time series, rather than specific time points. This leverages the multivariate property of the datasets for modelling the inter-dependencies between different variables over time. This was done because the normal attention mechanism treats each time step as one "data column", while ignoring the interplay between different variables, including some which might be noisy or especially important.

First a multivariate RNN is used to process the data input. Then a CNN is used to process this data h(t−w) . . . h(t−1) row by row, creating C weighted sums of all hidden state representations of the different variables. A scoring "attention" function is later used to assign weights to these C representations according to relevancy for the current input. The final prediction is the final hidden state $h_t$ concatenated with the weighted sum of the CNN output.

This model was tested on several MTS forecasting datasets and scored higher than state of the art and traditional models. In addition to testing performance, the authors also performed Discrete Fourier Transforms (DFT) on the convolutional filters and found sensible patterns. They found that different filters specialize in detecting different temporal patterns, for example one filter was found to detect 8-hour patterns while another detected daily patterns.

Deep Learning (DL) for Network Traffic Prediction

An early work using neural networks for network traffic prediction was performed by Yu and Chen [18]. They implemented a simple 3-layer feed forward neural network to predict video traffic in an Integrated Services Digital Network (ISDN). They have shown that their network is superior to previous linear models, such as Autoregressive Integrated Moving Average (ARIMA) model (ARIMA) model (a model which is fitted to time series data either to better understand the data or to predict future points in the series (forecasting)), in terms of prediction accuracy.

The method proposed by the present invention uses multivariate time series data, in the form of traffic statistics from several autonomous systems and handovers, which are sampled synchronously.

Park and Woo [13] applied a BILINEAR RNN (BRNN) with a dynamic learning rate, to predict Ethernet traffic data, with a 0.01 second sampling rate, over a two hour time period. By the Normalized Mean Squared Error (NMSE) measure, they managed to outperform "vanilla neural networks" (multilayer perceptron—a class of feedforward artificial neural network), as well as BRNN, without dynamic learning rate. Although, the short time scale of the data does not allow the modeling of daily, weekly and seasonal patterns by the NN weights.

Andreoletti et al. [1] applied Diffusion convolutional recurrent neural networks for network traffic forecasting. They treated a specific backbone network as a graph, with each node being a unit in the network and each edge representing the bits transferred between two units in a certain time period. Their graph-convolutional NN is able to take advantage of the graph structure when predicting the traffic amounts for the next time period, and they have shown this outperforms methods such as vanilla Long-Short Term Memory units (LSTM—an artificial recurrent neural network (RNN) architecture used in the field of deep learning) and Multi-Layer Perceptron (MLP—a class of feedforward artificial neural network).

Mozo et al. [11] proposes a Convolutional Neural Network (CNN—a class of neural networks that specializes in processing data that has a grid-like topology, such as an image) architecture for predicting short-term changes (in the scale of minutes) in the amount of traffic crossing a data center network. The motivation for this task is the rise of virtual internet services, which rely mainly on virtual machines and allow high flexibility in network configurations. The optimization of these configurations can lead to energy savings and improved bandwidth delivered to customers.

Their network receives as input a multivariate time series, which is actually the same uni-variate data sampled at different levels of granularity. Each level of granularity is fed into a different 1D convolutional filter. These channels are added together, thus learning the relationship between these different resolutions by the NN. In contrast, the present invention is focuses on the prediction of multivariate data coming from various autonomous systems, and on the ability to predict traffic overflows in each handover network separately.

Network Traffic Routing

Routing, as well as Traffic Engineering (TE—performance evaluation and performance optimization of operational IP networks) is usually split into two parts—internal and external. Generally, ISPs are free to choose how to implement internal traffic engineering. However, external TE is usually restricted to Border Gateway Protocol (BGP—a standardized exterior gateway protocol designed to exchange routing and reachability information among autonomous systems Internet) announcements, which are either coarse grained or produce a lot of address space disaggregation. In any case, TE aims to distribute the load into and inside the network in a way that overloads are avoided.

Overflow traffic is defined as traffic that shifts from Hypergiants Private Network Interfaces (PNI) onto general internet peering links. Due to the fact that most ingress traffic today comes into network via PNIs, the public peerings (performed across a shared network) are much smaller as they do not carry the bulk load of the content anymore. Thus, a small percentage on a PNI can already overload a public peering link, which not only affects traffic from the Content Delivery Network (CDN—a geographically distributed network of proxy servers and their data centers), but also degrades performance for all other traffic utilizing the interconnection.

A network provider that should react to an overflow event before performance degrades should take two steps. First, before the overflow happens, there should be a notification that an overflow is imminent. In typical scenarios, this can be done via email and/or phone call between the hypergiant and the ISP, but more often, a more automated solution is required. Therefore, the first step must be an automated detection of possible overflow events to happen in the near future, based solely on data available from the ISP itself.

When the first step detects that an overflow is imminent, the second step should be reacting in time to an overflow event, to mitigate its effect on degraded network performance.

Autonomous Systems

Autonomous Systems (ASs) are a collection of network prefixes in the internet, owned by an Internet Service Provider (ISP). In the present invention, the volume of incoming traffic from the top ASs (volume-wise) into a major European service provider is being measured.

Handovers

Handovers are the specific interconnection nodes (public peering links) that will ingress the overflow traffic from a certain AS. Optimally, ingress traffic will flow through PNIs (the AS will act as its own handover). If traffic from a certain AS is transferred via a handover that is not itself and this usage exceeds a certain threshold, this is an overflow. At a single time point, data from a single autonomous system may be transferred via several handovers.

Netflow Data

Data regarding IP network traffic, as it enters or exits a network interface. In the present invention, this data is aggregated hourly and contains the volume of ingress data from different ASs, through different handovers.

Overflow-Prone Series

An overflow-prone series is defined as a uni-variate time series defining amounts of traffic in gigabytes per second (GBPS) over time, which came from a certain AS and was ingressed via a different (alternative) handover. The sum of several overflow-prone series is an overflow-prone series by itself. This is defined as "overflow-prone", because in most cases, routing AS traffic through different handovers is normal. It is only when this routing exceeds certain volumes that we classify this as overflow traffic.

Figure 3:
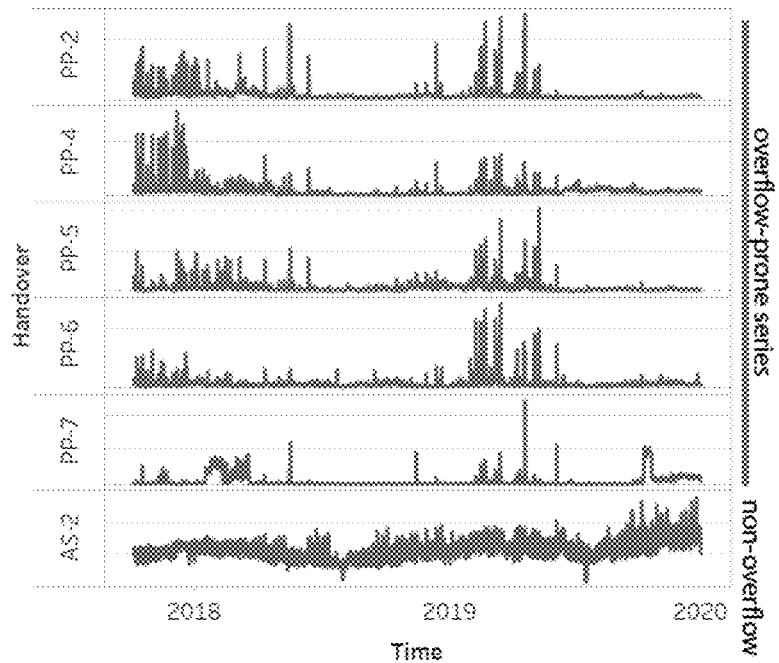
FIG. 3 shows a graphical view of overflow definitions.

FIG. 3 shows a graphical view of overflow definitions. The sum of all overflow-prone series is an overflow-prone series, as well.

Now the problem of Netflow traffic overflow forecasting using Netflow data, and the derived problem of overflow prediction with regard to a chosen threshold are being defined.

The Netflow traffic overflow forecasting problem can be formally defined as: At time T, given hourly sampled traffic overflow volume from the last N hours, predict:
  Sum prediction: The sum of overflow-prone traffic amount for all handovers at time T+h.
  Per handover prediction: The overflow-prone traffic amount at time T+h for a certain handover.

In the method proposed by present invention, T=15:00 and h=2, 3, 4, 5, 6 were chosen, in order to make predictions at 15:00 o'clock regarding the overflow-prone hours which are 17:00-21:00. Formally, at time T=15:00 the model receives $X_{T-N}, X_{T-N+1}, \ldots, X_{T-1}$ as input and outputs the prediction $X_{T+2}, X_{T+3}, \ldots, X_{T+6}$. Each X represents an n-column vector, with n being the number of handovers through which a specific AS's traffic may be ingressed. The derived overflow prediction model can be defined as: Given the predictions from the previous problem and a pre-defined calculated threshold for each overflow-prone series:

1) extract the maximum daily overflow value per overflow series, and 2) if the extracted value is higher than the threshold, this overflow series at this day is labeled as "overflow" for this specific overflow-prone series. Otherwise it is not. The threshold, for each overflow series, is assumed to be known in advance and to represent a value from which higher volumes will cause risk or induce large financial costs to the ISP. Different versions of this threshold have been tested in the present invention, for example conforming to the formula Average(over flow)+X×std(over flow), wherein over flow is a vector containing all time points for a certain overflow-prone series. A threshold for each overflow-prone series was chosen such that a reasonable amount of overflows exist in the data (between 5% and 20%).

In order to solve the prior art problems, the method proposed by the present invention uses several deep learning models, including a combination of simple and state of the art architectures.

The overflow prediction task was treated as an MTS forecasting problem, where a threshold was defined indicating whether an overflow occurred in a specific time period or not. After experimenting with several ensemble techniques, it was found that best results are attained using, for example, a simple average between model predictions.

An example of the models that were used in the overflow prediction ensemble is:
  LSTNet [15]. An MTS forecasting RNN+CNN architecture. A period of p=24 was used, which leverages the daily patterns in the data, as stated by Lai et al. [8].
  a vanilla LSTM [5] recurrent neural network model, containing four LSTM layers with a hidden dimension of 100 and a "dense" fully connected output layer.
  5 convolutional neural networks (CNNs) automatically generated by EEG Neural Architecture Search (EEG-NAS) [14], an evolutionary Neural Architecture Search (NAS) algorithm. The architectures may contain some redundant calculations (such as several Exponential Linear Unit (ELU) activation functions one after the other), but empirically under the search space defined by EEGNAS, these architectures were found to reach the best prediction performance on a hold-out validation set.
  A CNN architecture automatically found by NSGA-Net by Lu et al. [9], another state of the art Neural Architecture Search (NAS—a technique for automating the design of artificial neural networks) algorithm. The algorithm searches for good structures of CNN building blocks, and these building blocks are eventually combined in a predefined manner to form the final network.

Figure 4:
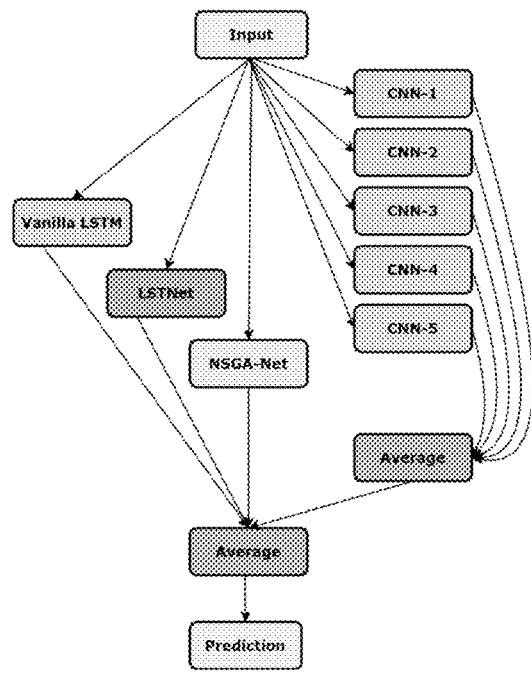
FIG. 4 shows the overflow prediction architecture, proposed by the present invention.

FIG. 4 shows the overflow prediction architecture, proposed by the present invention. CNN 1-5 were found using the EEGNAS [14] NAS algorithm. The prediction is either for the sum of all overflows (univariate), or a specific prediction for each relevant handover (multi-variate).

The RNN-based MTS forecasting models that were used are known for their ability to capture long and short-term temporal patterns in the data. Likewise, the CNN models know to capture interdependencies between different variables in the MTS data, as well as temporal patterns. This ensemble brings together the "best of both worlds" into one overflow predictor model.

When predicting overflow traffic, the method proposed by the present invention treated two main goals. The first goal is the prediction of traffic overflow volume in the sum of all handovers (which are not the source autonomous system). The rationale behind this prediction is that all traffic flowing through these handovers is regarded as overflow and predicting these volumes ahead of time will allow preparation of IT personnel, which will hopefully reduce the actual overflow traffic. The second goal is to predict the overflow volumes for each handover independently. A situation may occur when a certain overflow is concentrated in a small subset of handovers, thus a more targeted solution is preferable to avoid it. The ability to predict handovers in specific handovers will allow IT operators to utilize higher precision countermeasures to prevent traffic overflows in a specific autonomous system. In technical terms, the second goal required us to expand the final layer of each member of the ensemble to include #handovers×5 predictions, instead of just 5, thus predicting the overflow values for all handovers for the hours 17:00-21:00.

Figure 5:
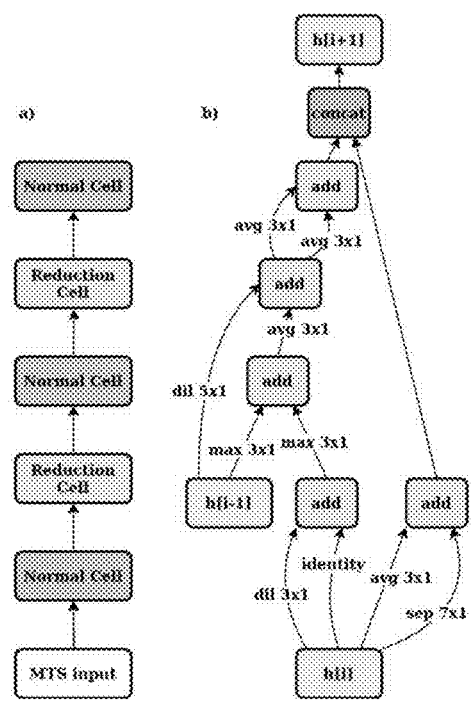
FIGS. 5A and 5B show the architecture obtained by NSGA for Netflow data forecasting.

FIG. 5 shows the hard-coded macro architecture obtained by NSGA for Netflow data forecasting. Each cell receives as input the previous two cells' outputs (h[i−1] and h[i]). The normal cells retain the activation map size, while reduction cells reduce the activation map size by a factor of 2, while doubling the number of channels in the data. sep=depthwise separable convolution, dil=dilated convolution, avg=average pooling. The kernel sizes for each operation are shown near the operation names.

Hyper Parameter Tuning

The configuration proposed by the present invention was chosen after testing all possible subsets of the following forecasting methods: LSTNet, EEGNAS, NSGA-Net, vanilla 4-layer LSTM, attention network and WaveNet [12] (the attention network and WaveNet did not sufficiently improve prediction results, so the remaining four models were left in the ensemble).

One possible example of the ensemble method used by the present invention may be a simple average of model forecasts, which provided the best results.

All networks in the ensemble were pre-trained for 800 epochs of the data, with early stopping after 80 non-improving epochs. The Adam optimizer (an adaptive learning rate optimization algorithm that's been designed specifically for training deep neural networks) and Mean Squared Error (MSE) loss (is the mean overseen data of the squared differences between true and predicted values) are used for NN training. A window size of 240 hours for data window splitting was chosen empirically after testing the performance of 120, 240 and 480 hour windows. All code was written in python 3.7, using the PyTorch deep learning framework (an open source machine learning library based on the Torch library, used for applications such as computer vision and natural language processing). Model training was performed using a Nvidia 2080RTX GPU, and took around 12 hours for a complete 10-fold cross-validation experiment on all available data.

Results

To evaluate the proposed forecasting method, a multi-protocol approach has been used, based on network data gathered inside a Tier-1 ISP over a time span of 2 years. First, Netflow, BGP and Simple Network Management Protocol (SNMP—an Internet Standard protocol for collecting and organizing information about managed devices on IP networks and for modifying that information to change device behavior) were collected separately inside the ISPs network. Then, the three protocols were correlated to produce a Source-Destination-Matrix (SDM) that defines on a per AS level the data flows inside the ISP. Then the top-10 autonomous systems (traffic volume-wise) were extracted from the data and their traffic behavior was focused.

Data in all handovers of all autonomous systems has been normalized with MinMaxScaler of the sklearn Python package prior to prediction, given as: $X_{scaled}=(X-X.min)/(X.max-X.min)$ where X.min is a vector containing the minimum value in time for each handover during the selected time range (and X.max accordingly).

Each data sample is a 2D matrix representing 240 hourly measurements of traffic volume for each handover of certain AS with dimensions timeX#handovers. To train a model for generating predictions for the handovers of certain AS, data from all of the 10 autonomous systems mentioned above was used as input for the ensemble. Not all autonomous systems have the same number of handovers. This inconsistency was handled by zero-padding (adding zeros to end of a time-domain signal to increase its length) all data in the "handover" axis of all autonomous systems to fit the AS with the highest number of handovers.

All experiments have been conducted using 10-fold cross validation in time, using forward chaining. It means that each multivariate time series is split into 11 chronological parts as [1, 2, 3, 4, 5, ..., 11]. Ten models were trained as so:

Model 1: Train data: [1], Test data: [2]
Model 2: Train data: [1, 2], Test data: [3]
Model 3: Train data: [1, 2, 3], Test data: [4]
and so on . . . .

The reported results are calculated by concatenating all test set predictions, thus receiving predicted data for segments [2, 3, 4, ..., 11] and comparing them with the ground truth (the actual traffic volume). This evaluation approach ensures we are forecasting using only past data, as in real-life situations.

Traffic Volume Forecasting

The overflow prediction problem was approached by predicting the actual overflow traffic volume for a given time in the future. To evaluate the proposed method, the following measures were used:

$$\text{Root Relative Squared Error } (RRSE)\text{- } E_i = \sqrt{\frac{\sum_{j=1}^{n}(P_{(ij)} - T_j)^2}{\sum_{j=1}^{n}(T_j - \overline{T})^2}}.$$

Where $P_{(ij)}$ is the value predicted by the individual program i for sample case j (out of n sample cases); $T_j$ is the target value for sample case j; and is given T by the formula:

$$\overline{T} = \frac{1}{n}\sum_{j=1}^{n} T_j$$

$$\text{Root Absolute Error } (RAE)\text{-}. \quad E_i = \frac{\sum_{j=1}^{n}|P_{(ij)} - T_j|}{\sum_{j=1}^{n}|T_j - \overline{T}|}$$

Empirical Correlation Coefficient (CORR—is a statistical measure of the strength of the relationship between the relative movements of two variables).

where Y^ are traffic predictions (maximum predicted value per day), Y are ground truth values (maximum ground truth value per day), and X⁻=mean(X).

These three measures allowed comparing between the different settings we experimented with, in order to reach the best model configurations.

Regression forecasting results for the 10-fold experiment are shown in table 2 below, and graphically shown at FIG. 7 (for a selected three autonomous systems). From these results one can see that although the per-handover forecasts are better in average than results for the sum of all handovers, their standard deviation between different model training sessions and different handovers is much higher than the "sum" forecasters. This means that they are very accurate for several handovers and much less accurate for others. This may be of use if the handovers for which the model is accurate are the important ones, based on which action needs to be taken, but may be a disadvantage otherwise.

The above regression measures are common practice in MTS forecasting evaluation, but they are not entirely suitable on their own for the evaluation of traffic overflow prediction. The metric that interests the most for traffic overflow prediction is whether an overflow will occur in a certain day. This is all that is needed to perform the required mitigation techniques and remove the risk. Higher resolution forecasts may give additional insights to the underlying network dynamics, but are irrelevant for the overflow prediction problem.

Albeit the above conclusion, it have been concluded that for the problem of traffic overflow prediction, these measures, which are common in MTS forecasting, are unsuitable for the problem of overflow prediction.

Table 2 shows for example, that the AS-2 scored an average RRSE of 1.03. According to this measure, our predictor is almost worse than the naive predictor, which predicts the mean value at all times. Predicting the mean of all true values in this case will yield a TPR of 0%, as the mean is below the overflow threshold. The important factor is the amount of days with overflow which proposed model correctly classified as days containing an overflow. Therefore, binary accuracy measure results are more important than standard regression measure results.

Additionally, the proposed predictor may produce noisy predictions at times, and thus suffer from low regression measure scores, but the real measure of interest is the quality of overflow prediction, which is measured as a normal binary classification problem (whether an overflow occurred in a certain day) with the area under the ROC curve (Area Under The Curve (AUC)=0.86 for AS-2).

accuracy rate will enable IT operators to receive timely alerts for most of the overflow occurrences, while maintaining a low false alarm rate (<5%). The present invention predictor tends to under-estimate the overflow values, and by choosing a classification threshold smartly using the Receiver Operating Characteristic (ROC) curve (a graphical plot that illustrates the diagnostic ability of a binary classi-

TABLE 2

Pearson correlation coefficient (CORR), relative absolute error (RAE), and root relative squared error (RSE) for the prediction of traffic overflow volumes in the top-10 autonomous systems. Results are aggregated over 3 independent ensemble training runs.

| | Sum of predictions | | | | | | | | | Prediction of sum | | | | | | | | |
|---|---|---|---|---|---|---|---|---|---|---|---|---|---|---|---|---|---|---|
| | CORR | | | RRSE | | | RAE | | | CORR | | | RRSE | | | RAE | | |
| AS | Avg. | Max. | Std. | Avg. | Min. | Std. | Avg. | Min. | Std. | Avg. | Max. | Std. | Avg. | Min. | Std. | Avg. | Min. | Std. |
| AS-1 | 0.52 | 0.58 | 0.07 | 0.82 | 0.76 | 0.09 | 0.86 | 0.82 | 0.04 | 0.39 | 0.54 | 0.13 | 0.87 | 0.83 | 0.06 | 0.92 | 0.85 | 0.06 |
| AS-2 | 0.50 | 0.52 | 0.02 | 1.03 | 0.99 | 0.04 | 0.89 | 0.87 | 0.02 | 0.49 | 0.52 | 0.03 | 0.95 | 0.90 | 0.04 | 0.88 | 0.86 | 0.02 |
| AS-3 | 0.54 | 0.57 | 0.03 | 0.74 | 0.63 | 0.10 | 0.85 | 0.82 | 0.03 | 0.29 | 0.31 | 0.02 | 1.13 | 1.11 | 0.02 | 1.08 | 1.03 | 0.04 |
| AS-4 | 0.94 | 0.94 | 0.00 | 0.29 | 0.29 | 0.00 | 0.35 | 0.35 | 0.01 | 0.83 | 0.89 | 0.05 | 0.48 | 0.38 | 0.09 | 0.56 | 0.47 | 0.09 |
| AS-5 | 0.94 | 0.95 | 0.01 | 0.26 | 0.25 | 0.01 | 0.34 | 0.33 | 0.02 | 0.57 | 0.59 | 0.02 | 0.74 | 0.69 | 0.05 | 0.93 | 0.91 | 0.03 |
| AS-6 | 0.71 | 0.74 | 0.04 | 0.61 | 0.57 | 0.04 | 0.72 | 0.68 | 0.05 | 0.62 | 0.67 | 0.05 | 0.67 | 0.65 | 0.03 | 0.79 | 0.75 | 0.03 |
| AS-7 | 0.69 | 0.70 | 0.02 | 0.75 | 0.72 | 0.02 | 0.74 | 0.72 | 0.02 | 0.51 | 0.53 | 0.03 | 0.84 | 0.78 | 0.07 | 0.87 | 0.85 | 0.03 |
| AS-9 | 0.96 | 0.97 | 0.01 | 0.26 | 0.24 | 0.03 | 0.28 | 0.27 | 0.03 | 0.90 | 0.94 | 0.04 | 0.56 | 0.50 | 0.05 | 0.55 | 0.51 | 0.04 |
| AS-10 | 0.89 | 0.89 | 0.01 | 0.44 | 0.41 | 0.02 | 0.48 | 0.48 | 0.00 | 0.38 | 0.54 | 0.14 | 1.05 | 1.01 | 0.05 | 1.03 | 1.00 | 0.05 |
| Averge | 0.74 | 0.76 | 0.02 | 0.58 | 0.54 | 0.04 | 0.61 | 0.59 | 0.02 | 0.55 | 0.61 | 0.06 | 0.81 | 0.76 | 0.05 | 0.85 | 0.80 | 0.01 |

Overflow Prediction

In order to obtain actionable insights from the traffic volume forecasting results, the problem of traffic overflow prediction was defined. First, a threshold was defined for each overflow-prone series, for which traffic volume above this threshold is considered an "overflow" and traffic volume below this threshold is not. This binary decision is tested in a daily resolution, meaning that if measures for a single hour between 17:00 and 21:00 in a certain day passed the threshold, the day is classified as "overflow".

Several thresholds were tested and the results vary for the different autonomous systems. For example, all thresholds may be defined as mean(volume)+n×std(volume), wherein the volume is the vector which containing all data points in a chosen time period. n=[0.5, 1, 2, 3] was tested for all autonomous systems and all handovers.

Predict Overflows for Sum of All Handovers

In the first experiment the goal was to predict the occurrence of traffic overflows when treating the sum of all handovers of a specific autonomous system as an overflow-prone series.

Figure 7:
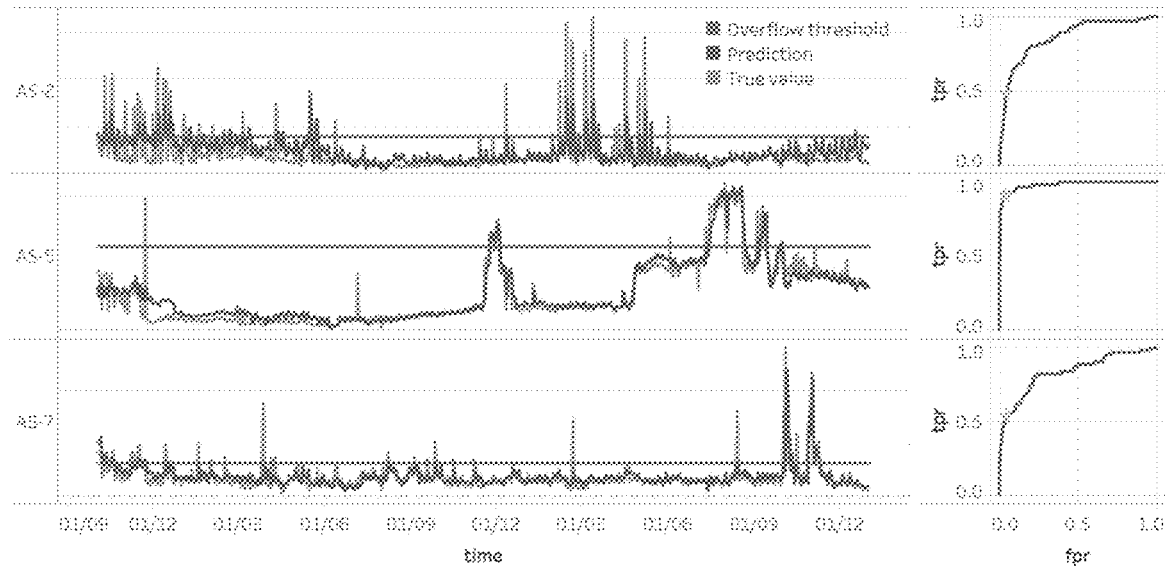
FIG. 7 shows the prediction results for "AS-2", "AS-5" and "AS-7" autonomous systems.

FIG. 7 shows the prediction results for the AS-2, AS-5 and AS-7 autonomous systems. The prediction is for the sum of traffic in all handovers excluding the handover which is the AS itself. These results have been obtained using 10-fold cross validation in time, and plotted is the test data concatenated across all 10 folds.

It can be seen that despite of having a relatively high RRSE measure, TPR/FPR rates for autonomous systems such as AS-5 and AS-9 are good TPR >60%, FPR <5%. This fier system as its discrimination threshold is varied), we are able to reach high classification results.

There are two different thresholds for classification of overflows. The first is the "external" threshold, defined externally by an oracle as mean(volume)+n×std(volume). This threshold defines "what is an overflow?", meaning when do IT operators need to reroute traffic because of high volume in overflow-prone series. The second is "internal", which is the model's decision threshold, as shown in the ROC graphs in FIG. 1. The "internal" threshold is chosen such that a false alarm rate of no more than 5% will be maintained.

Predict Overflows for Specific Handovers

Figure 6:
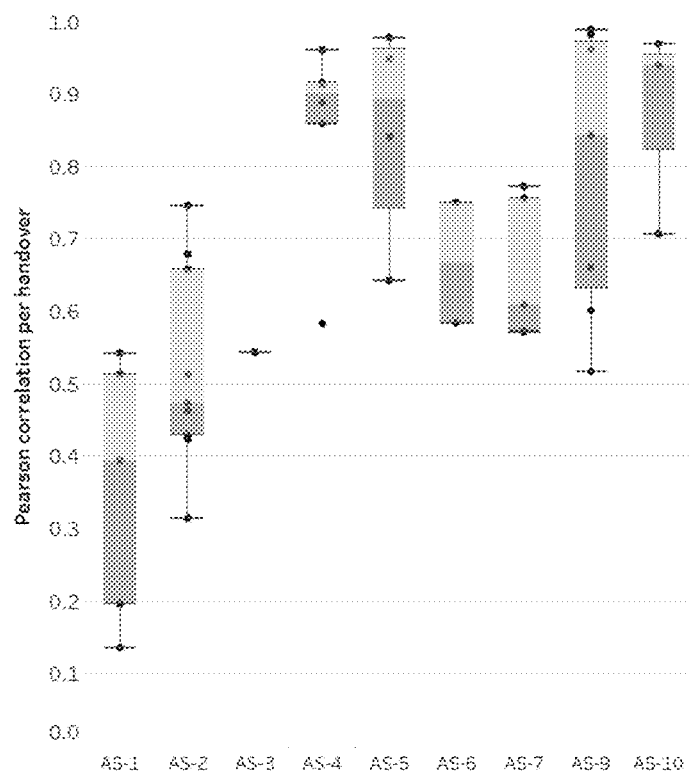
FIG. 6 shows regression results for all autonomous systems, per handover of each one.

The ability to predict overflows in specific handovers will allow IT operators to utilize higher precision countermeasures to prevent traffic overflows in a specific autonomous system. For this reason the original network ensemble of the present invention was expanded by widening the final layer such that for each input array of 240 X #handovers a matrix of size 5 X #handovers will be predicted (5 predicted time points for hours 17:00-21:00 for each handover related to the tested autonomous system). The correlation performance of this method for all autonomous systems and handovers is depicted in FIG. 6. It can be observed that prediction accuracy for several handovers is very high while some suffer from low performance.

A usable overflow predictor was defined to be one with very low false positive rate (<0.5%), while maintaining a reasonable level of true positive rate (<0.6%).

TABLE 1

Prediction results for each autonomous system, using aggregated testing data from 3 different training runs. Shown are results for the prediction of sum of overflows in all handovers, and for the sum of individual predictions per handover. All FPR reported relate to the point we defined as optimal (with regard to false alarms), where the FPR is just below 0.05.

| | | | Sum of predictions | | | | | | Prediction of sum | | | | | |
|---|---|---|---|---|---|---|---|---|---|---|---|---|---|---|
| | | | AUC | | | TPR | | | AUC | | | TPR | | |
| AS | Threshold | % Over. | Avg. | Max. | Std. | Avg. | Max. | Std. | Avg. | Max. | Std. | Avg. | Max. | Std. |
| AS-1 | 0.70 | 7.32 | 0.81 | 0.84 | 0.05 | 0.44 | 0.52 | 0.06 | 0.72 | 0.78 | 0.06 | 0.31 | 0.47 | 0.14 |
| AS-2 | 3.00 | 8.05 | 0.86 | 0.87 | 0.01 | 0.46 | 0.50 | 0.04 | 0.85 | 0.87 | 0.02 | 0.39 | 0.44 | 0.06 |
| AS-3 | 1.70 | 7.20 | 0.85 | 0.87 | 0.02 | 0.60 | 0.66 | 0.07 | 0.70 | 0.76 | 0.06 | 0.07 | 0.10 | 0.04 |
| AS-4 | 2.50 | 7.80 | 0.97 | 0.97 | 0.00 | 0.87 | 0.91 | 0.05 | 0.90 | 0.95 | 0.05 | 0.46 | 0.85 | 0.34 |
| AS-5 | 1.00 | 7.56 | 0.98 | 0.99 | 0.00 | 0.94 | 0.95 | 0.01 | 0.74 | 0.85 | 0.01 | 0.15 | 0.42 | 0.24 |
| AS-6 | 3.00 | 12.56 | 0.89 | 0.91 | 0.03 | 0.56 | 0.63 | 0.06 | 0.81 | 0.82 | 0.01 | 0.44 | 0.56 | 0.11 |
| AS-7 | 1.60 | 7.68 | 0.83 | 0.84 | 0.01 | 0.53 | 0.56 | 0.02 | 0.80 | 0.83 | 0.03 | 0.40 | 0.43 | 0.04 |
| AS-9 | 2.30 | 7.20 | 0.99 | 0.99 | 0.00 | 0.97 | 0.97 | 0.00 | 0.97 | 0.98 | 0.01 | 0.78 | 0.87 | 0.08 |
| AS-10 | 3.00 | 1.34 | 0.95 | 0.97 | 0.01 | 0.61 | 0.82 | 0.19 | 0.76 | 0.93 | 0.15 | 0.24 | 0.45 | 0.19 |
| Averge | | 7.41 | 0.90 | 0.92 | 0.02 | 0.67 | 0.72 | 0.06 | 0.82 | 0.86 | 0.04 | 0.36 | 0.51 | 0.14 |

Deep Learning (DL) Model Visualization

There has been a recent surge in interest in the field of DL explainability, in order to unveil these seemingly black box models and try to explain the logic behind their operations in a human understandable manner. Following this trend, with the aim of understanding the decision making process of the prediction DL ensemble, the "Deeplift" [16] visualization method by Shrikumar et al. was utilized to understand which parts of the input data affected the prediction the most. Deeplift attains the feature attribution of each part of the input by back-propagating the different neurons back to the input. The difference in these errors was shown in the paper to provide good feature importance values for the input data.

It is possible to see that before training the network gives higher importance to evening hours, rather than morning/noon hours. This is an expected behavior as these hours contain measurements with higher values. After training, this behavior is preserved but additional patterns are discovered. It is clearly visible that the network gives high importance to weekly patterns by the high importance values observed in day 7. Additionally, the 3 days before each prediction have a higher weight than any other day when making the forecast. For prediction of the later hours (20:00, 21:00), data 4 and 5 days before prediction is found to be useful, as well.

FIG. 7 (left) shows Traffic overflow prediction results for 3 different autonomous systems (summed across all handovers). The concatenated test sets taken from 10-fold cross-validation in time are shown. FIG. 7 (right) shows the AUC-ROC curve (a performance measurement for the classification problems at various threshold settings) regarding the threshold shown on the left.

Figure 8:
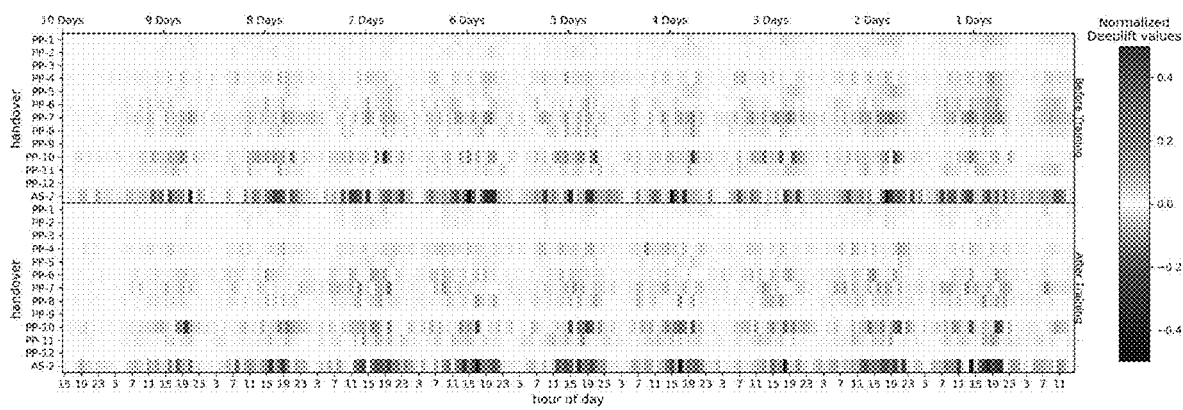
FIG. 8 shows the Average feature importance for the test of AS-2, averaged amongst all the predicted hours (between 17:00 and 21:00), calculated by the Deeplift technique.

FIG. 8 shows the Average feature importance for the test set of AS-2, for the average of predicted hours between 17:00 and 21:00, calculated by the Deeplift technique, where the top shows a Deeplift calculated on a model trained with 1 epoch and the bottom shows a Deeplift calculated on a model trained with 800 epochs.

There are many approaches to respond to networking risks that are characterized by aspects such as in which domain they apply (intra-domain, inter-domain), how many different network layers they address (single or multi-layer), which scope they encompass (local, segment-wise, global), when and in which fashion the response action is set-up, and to what degree redundant network resources are reserved (see e.g. [Cholad2013]). For overflow situations, also a range of possible response and recovery methods can be applied. The present invention's method proposes various classes of recovery methods and discussing their advantages and disadvantages for real network operations. Overflow risk mitigation falls into the category of inter-domain response methods, as overflow events involve at least two domains: the domain/AS of the eyeball network (the point of reference) and the domains/AS of the hyper-giants that are interconnected with the eyeball network. Overflow events as were defined, occur and are monitored on the IP layer. The response action can also take place on this single layer.

The above examples and description have of course been provided only for the purpose of illustrations, and are not intended to limit the invention in any way. As will be appreciated by the skilled person, the invention can be carried out in a great variety of ways, employing more than one technique from those described above, all without exceeding the scope of the invention.

REFERENCES

[1] Davide Andreoletti, Sebastian Troia, Francesco Musumeci, Giordano Silvia, GUIDO ALBERTO Maier, and Massimo Tornatore. 2019. Network Traffic Prediction based on Diffusion Convolutional Recurrent Neural Networks. In *INFOCOM*. 1-6.

[2] Yen-Yu Chang, Fan-Yun Sun, Yueh-Hua Wu, and Shou-De Lin. 2018. A MemoryNetwork Based Solution for Multivariate Time-Series Forecasting. *arXiv preprint arXiv:*1809.02105 (2018).

[3] Piotr Chołda, Eirik L. Følstad, Bjarne E. Helvik, Pirkko Kuusela, Maurizio Naldi, and Ilkka Norros. 2013. Towards risk-aware communications networking. *Reliability Engineering & System Safety* 109 (2013), 160-174. https://doi.org/10.1016/j.ress.2012.08.009

[4] Djork-Arné Clevert, Thomas Unterthiner, and Sepp Hochreiter. 2015. Fast and accurate deep network learning by exponential linear units (elus). *arXiv preprint arXiv:*1511.07289 (2015).

[5] Sepp Hochreiter and Jürgen Schmidhuber. 1997. *Long short-term memory. Neural computation* 9,8 (1997), 1735-1780.

[6] Craig Labovitz. 2016. The New Internet. Presentation given at Global Peering Forum 11 (Apr. 11, 2016). Url: https://www.globalpeeringforum.org.

[7] Craig Labovitz, Scott lekel-Johnson, Danny McPherson, Jon Oberheide, and Farnam Jahanian. 2010. Internet inter-domain traffic. *SIGCOMM Comput. Commun. Rev.* 41, 4 (August 2010),—.http://dl.acm.org/citation.cfm?id=2043164.1851194

[8] Guokun Lai, Wei-Cheng Chang, Yiming Yang, and Hanxiao Liu. 2018. Modeling long-and short-term temporal patterns with deep neural networks. In *The 41st International ACM SIGIR Conference on Research & Development in Information Retrieval. ACM,* 95-104.

[9] Zhichao Lu, Ian Whalen, Vishnu Boddeti, Yashesh Dhebar, Kalyanmoy Deb, Erik Goodman, and Wolfgang Banzhaf. 2019. NSGA-Net: neural architecture search using multi-objective genetic algorithm. In *Proceedings of the Genetic and Evolutionary Computation Conference. ACM,* 419-427.

[10] Seyedmandad Mirsamadi, Emad Barsoum, and Cha Zhang. 2017. Automatic speech emotion recognition using recurrent neural networks with local attention. In *2017 IEEE International Conference on Acoustics, Speech and Signal Processing (ICASSP).* IEEE, 2227-2231.

[11] Alberto Mozo, Bruno Ordozgoiti, and Sandra Gomez-Canaval. 2018. Forecasting short-term data center network traffic load with convolutional neural networks. *PloS one* 13, 2 (2018), e0191939.

[12] Aaron van den Oord, Sander Dieleman, Heiga Zen, Karen Simonyan, Oriol Vinyals, Alex Graves, Nal Kalchbrenner, Andrew Senior, and Koray Kavukcuoglu. 2016. Wavenet: A generative model for raw audio. *arXiv preprint arXiv:*1609.03499 (2016).

[13] Dong-Chul Park and Dong-Min Woo. 2009. Prediction of network traffic using dynamic bilinear recurrent neural network. In 2009 *Fifth International Conference on Natural Computation,* Vol. 2. IEEE, 419-423.

[14] Elad Rapaport, Oren Shriki, and Rami Puzis. 2019. EEGNAS: Neural Architecture Search for Electroencephalography Data Analysis and Decoding. In *International Workshop on Human Brain and Artificial Intelligence. Springer,* 3-20.

[15] Shun-Yao Shih, Fan-Keng Sun, and Hung-yi Lee. 2019. Temporal pattern attention for multivariate time series forecasting. *Machine Learning* 108, 8-9 (2019), 1421-1441.

[16] Avanti Shrikumar, Peyton Greenside, and Anshul Kundaje. 2017. Learning important features through propagating activation differences. In *Proceedings of the 34th International Conference on Machine Learning-Volume* 70. JMLR. org, 3145-3153. Ashish Vaswani, Noam Shazeer, Niki Parmar, Jakob Uszkoreit, Llion Jones, Aidan N Gomez, Łukasz Kaiser, and Illia Polosukhin. 2017. Attention is all you need. In Advances in neural information processing systems. 5998-6008.

[17] Edmund S Yu and CY Roger Chen. 1993. Traffic prediction using neural networks. In *Proceedings of GLOBECOM '93. IEEE Global Telecommunications Conference* IEEE, 991-995.

[18] Eric Zivot and Jiahui Wang. 2006. Vector autoregressive models for multivariate time series. *Modeling Financial Time Series with S-Plus®* (2006), 385-429.

The invention claimed is:

1. A method for early predicting of impending data overflow situations in data networks, comprising:
 a) collecting monitored data regarding network traffic volume from content providers to an Internet Service Provider (ISP) entering or exiting the ISP via peering autonomous systems connected to the ISP via physical links;
 b) identifying alternative peering links being handovers, which are not inherent private network interconnects (PNIs) between said content providers and said ISP;
 c) determining static or dynamic threshold for dataflow anomaly associated with overflow;
 d) for each alternative handover, predicting impending overflow situation by applying ML algorithms to the collected data that corresponds to said each alternative handover; and
 e) providing, in advance, an alert to each ISP regarding a situation of the data overflow and the alternative channels that should be operated in said situation.

2. A method according to claim 1, wherein the applied ML algorithms are selected from the group of:
 a Convolutional Neural Network (CNN);
 a Recurrent Neural Networks (RNN);
 a Feed forward neural network;
 a Deep neural network; and
 Vanilla neural network.

3. A method according to claim 1, wherein data flow from content providers to an ISP is monitored for the volume of traffic and paths through which said traffic flows, by sensors being networked computers that typically do not provide services that are deployed over the data network.

4. A method according to claim 1, wherein an overflow situation is determined by the data passed across a handover and the transition times, while predicting, for each alternative handover, when said each alternative handover will be used to transfer at least a portion of the content.

5. A method according to claim 1, wherein the collected data is Multivariate Time Series (MTS) data, in the form of traffic from several autonomous systems and handovers, which are sampled synchronously.

6. A method according to claim 1, wherein overflow prediction is carried out using an ensemble of deep learning models.

7. A method according to claim 1, wherein the models that were used in the overflow prediction are a combination of LSTNet and Convolutional Neural Networks (CNNs) automatically generated by EEGNAS.

8. A method according to claim 1, wherein traffic overflow volume is predicted for the sum of all handovers, for providing indications regarding overflow situation.

9. A method according to claim 1, wherein traffic overflow volume is predicted separately for each specific handover, for providing indications regarding alternative links being candidates for overflow situations.

10. A system for early predicting of impending data overflow situations in data networks, comprising:
 a) one or more sensors being networked computers that do not provide services, for collecting monitored data regarding network traffic volume from content providers to an Internet Service Provider (ISP) entering or exiting the ISP via peering autonomous systems connected to the ISP via physical links;
 b) one or more processors executing one or more deep learning models, being adapted to:
 c) identify over said data network being handovers alternative peering links, which are not inherent Private Network Interconnects (PNI) between said content providers and said ISP;
 d) determine static or dynamic threshold for dataflow anomaly associated with overflow;

e) for each alternative handover, predict impending overflow situation by applying ML algorithms to the collected data that corresponds to said each alternative handover; and
f) provide in advance, an alert to each ISP regarding a situation of the data overflow and the alternative channels that should be operated in said situation.

11. A system according to claim 10, in which the applied ML algorithms are selected from the group of:
    a Convolutional Neural Networks (CNN);
    a Recurrent Neural Network (RNN);
    a Feed forward neural network;
    a Deep neural network; and
    a Vanilla neural network.

12. A system according to claim 10, in which an overflow situation is determined by the data passed across a handover and the transition times, while predicting, for each alternative handover, when said each alternative handover will be used to transfer at least a portion of the content.

13. A system according to claim 10, in which the collected data is Multivariate Time Series (MTS) data, in the form of traffic from several autonomous systems and handovers, which are sampled synchronously.

14. A system according to claim 10, in which overflow prediction is carried out using an ensemble of deep learning models.

15. A system according to claim 10, in which the models that were used in the overflow prediction are a combination of LSTNet and Convolutional Neural Networks (CNNs) automatically generated by EEGNAS.

16. A system according to claim 10, wherein traffic overflow volume is predicted for the sum of all handovers, for providing indications regarding overflow situation.

17. A system according to claim 10, in which traffic overflow volume is predicted separately for each specific handover, for providing indications regarding alternative links being candidates for overflow situations.

18. A method for early predicting of impending data overflow situations in data networks, comprising:
    a) collecting monitored data regarding network traffic volume from content providers to an Internet Service Provider (ISP) entering or exiting the ISP via peering autonomous systems connected to the ISP via physical links;
    b) identifying alternative peering links being handovers, which are not inherent private network interconnects (PNIs) between said content providers and said ISP;
    c) determining static or dynamic threshold for dataflow anomaly associated with overflow;
    d) for each alternative handover, predicting impending overflow situation by applying ML algorithms to the collected data that corresponds to said each alternative handover;
    e) providing in advance, an alert to each ISP regarding a situation of the Data overflow and the alternative channels that should be operated in said situation; and
    f) allowing said ISP to select alternative handovers through which excess data will be routed during predicted overflow periods.

19. A system for early predicting of impending data overflow situations in data networks, comprising:
    a) one or more sensors being networked computers that do not provide services, for collecting monitored data regarding network traffic volume from content providers to an Internet Service Provider (ISP) entering or exiting the ISP via peering autonomous systems connected to the ISP via physical links;
    b) one or more processors executing one or more deep learning models, being adapted to:
    c) identify over said data network being handovers alternative peering links, which are not inherent Private Network Interconnects (PNI) between said content providers and said ISP;
    d) determine static or dynamic threshold for dataflow anomaly associated with overflow;
    e) for each alternative handover, predict impending overflow situation by applying ML algorithms to the collected data that corresponds to said each alternative handover;
    f) providing in advance, an alert to each ISP regarding a situation of the Data overflow and the alternative channels that should be operated in said situation; and
    g) allow said ISP to select alternative handovers through which excess data will be routed during predicted overflow periods.

* * * * *